Feb. 19, 1952     F. K. ECCLES     2,585,921
BATHYTHERMOGRAPH PEN LIFTING ATTACHMENT
Filed Oct. 27, 1949     3 Sheets-Sheet 1
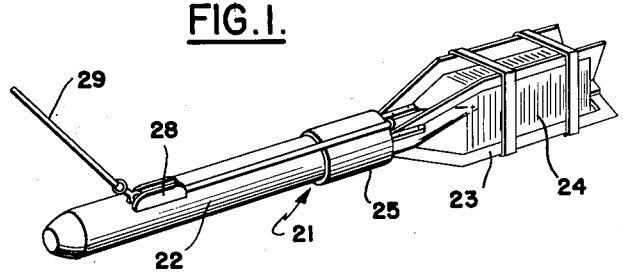
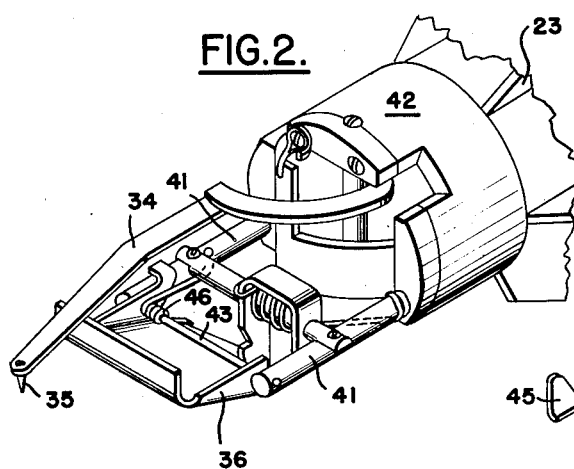
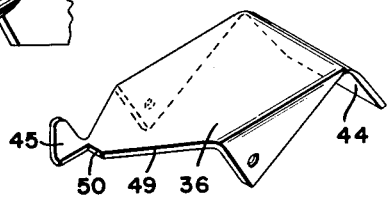
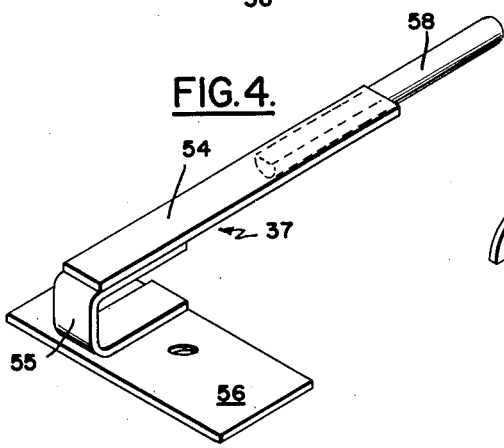
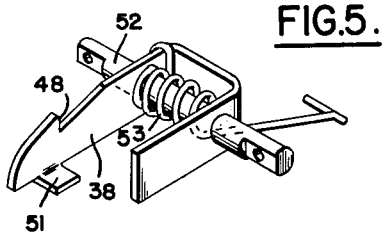
INVENTOR
FORREST KELLY ECCLES
BY
ATTORNEY Feb. 19, 1952 F. K. ECCLES 2,585,921
BATHYTHERMOGRAPH PEN LIFTING ATTACHMENT
Filed Oct. 27, 1949 3 Sheets-Sheet 2

INVENTOR
FORREST KELLY ECCLES
BY
ATTORNEY

Feb. 19, 1952     F. K. ECCLES     2,585,921
BATHYTHERMOGRAPH PEN LIFTING ATTACHMENT
Filed Oct. 27, 1949     3 Sheets-Sheet 3
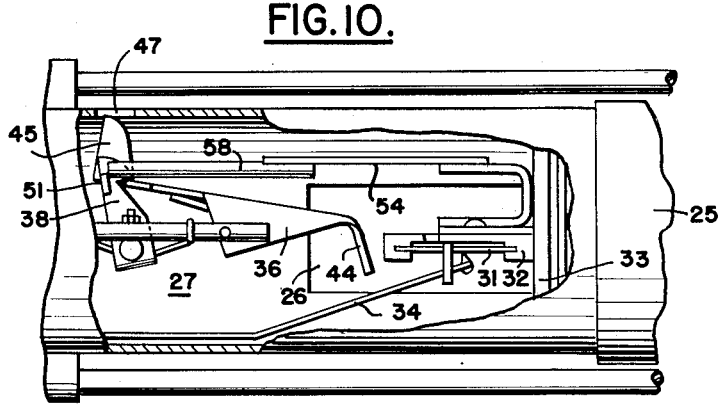
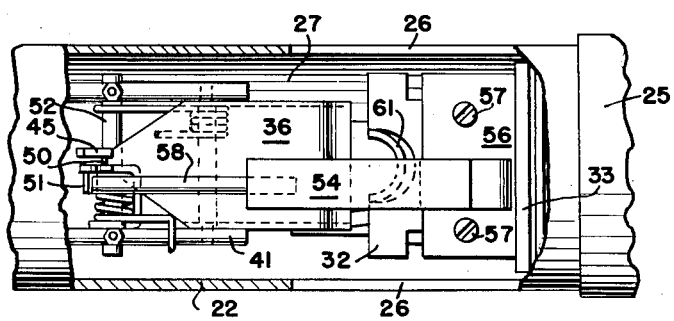
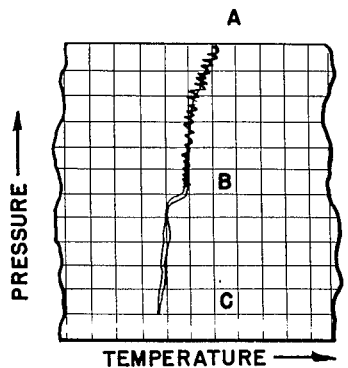
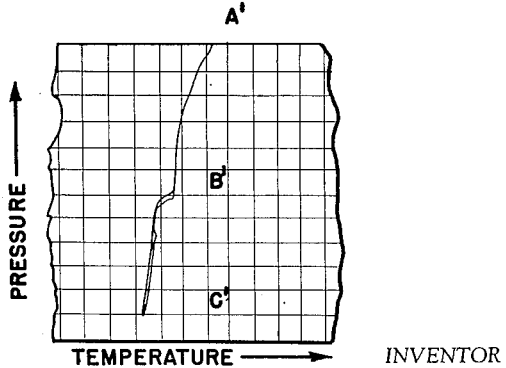
INVENTOR
FORREST KELLY ECCLES
BY
ATTORNEY Patented Feb. 19, 1952

2,585,921

UNITED STATES PATENT OFFICE 2,585,921

BATHYTHERMOGRAPH PEN LIFTING ATTACHMENT

Forrest Kelly Eccles, Reno, Nev.

Application October 27, 1949, Serial No. 123,872

8 Claims. (Cl. 346—33)

(Granted under the act of March 3, 1883, as amended April 30, 1928; 370 O. G. 757)

The present invention relates to a bathythermograph and more particularly to a bathythermograph having an automatic pen lifting arrangement which raises the pen from a record chart while the instrument is being pulled up to the surface of the water.

It is well known that a bathythermograph is a measuring instrument, which when it is lowered into water, produces on a record chart, a graph of hydrostatic pressure plotted against temperature. The usual construction of the record chart in such an instrument consists of a pen, or stylus, in contact with a smoked glass slide; the slide being arranged to move along one axis with variations in pressure while the pen moves independently, with variations in temperature, along an axis normal to that used for pressure. The result of combining these two separate motions is a temperature pressure graph of the medium surrounding the instrument.

In most of the bathythermographs shown in the prior art, the pen is in contact with the smoked glass slide at all times and consequently a trace is made on the slide when the instrument is lowered into the water and another trace is made when the instrument is brought back to the surface. One disadvantage of this system lies in the fact that the two traces never coincide because even though the device may be lowered straight down into the water and pulled straight up later, temperature variations in the second case may not be the exact inverse of those in the first case due to a shifting of the thermal layers of the water.

Another disadvantage of similar prior systems in which the stylus is in constant contact with a record chart lies in the fact that a bathythermograph observation taken from a vessel moving at high speed often produces an ambiguous slide because the trace at, or near, the surface is usually fuzzy. This fuzzy trace is due to vibration set up in the instrument while retrieving it, when its speed is effectively the speed of the ship plus the speed of the winch winding in the instrument cable. This vibration is transmitted to the stylus which often vibrates with an amplitude great enough to eliminate completely the downward trace; the downward trace normally being clear and readable for the instrument can sink freely.

The present invention corrects the deficiencies noted above by automatically moving the stylus out of contact with the record chart at a predetermined depth while the instrument is being brought to the surface of the water and in this manner a double trace is avoided through the elimination of a portion of the usual upward trace. Also the removal of the stylus from the record chart eliminates the possibility of a fuzzy upward trace obliterating an otherwise clear and readable downward trace.

Furthermore, the present invention represents an advance over similar prior known instruments not only in that it produces a single, clear and readable graph of temperature-pressure relations in the medium surrounding the instrument, but it also accomplishes this result entirely automatically and the pen or stylus will lift from the record chart at any predetermined depth. Operation of the pen lifting portion of the invention, in addition, does not depend upon the speed at which the instrument is retrieved, as is shown by some disclosures in the prior art, but will function effectively regardless of whether the instrument is retrieved fast or gradually. Use of the automatic pen lifting arrangement is not mandatory and it may be left inoperative so that the pen remains in contact with the smoked glass slide at all times thereby in no way affecting the performance of the bathythermograph. The pen lifting arrangement, furthermore, may be installed in all bathythermographs now in service without special tools or skills, and it is simple and foolproof in operation.

An object of the present invention is the provision of a bathythermograph having a pen lifting arrangement.

Another object is to provide a bathythermograph which produces a clear and distinct graph of the temperature-pressure relationship surrounding the instrument.

A further object of the invention is the provision of a temperature-pressure recording instrument which produces a single, clear and distinct trace.

Still another object is the provision of a bathythermograph having an automatic pen lifting arrangement which raises the pen at any predetermined depth.

Yet another object is the provision of a bathythermograph having an automatic pen lifting arrangement the use of which is not mandatory.

Another object is the provision of an automatic pen lifting arrangement which may be easily installed in all types of bathythermograph, and which is simple and foolproof in operation.

A final object is the provision of a bathythermograph having a pen lifting arrangement which functions automatically in response to pressure rather than the speed at which the instrument is being moved.

The exact nature of this invention as well as other objects and advantages thereof will be readily apparent from consideration of the following specification relating to the annexed drawings in which Fig. 1 shows a perspective view of a complete bathythermograph.

Fig. 2 shows a greatly enlarged fragmentary view of how a portion of the pen lifting apparatus is mounted.

Fig. 3 shows a perspective view of the pen lifter.

Fig. 4 is an enlarged view of the pen-lifter trigger.

Fig. 5 is an enlarged view of the pen-lifter latch.

Figs. 7 to 10 show successive steps in a cycle of operation of the pen-lifting attachment.

Fig. 11 is a top view of the assembled pen-lifting attachment.

Fig. 12 shows a fragmentary view of a typical bathythermograph chart, made without the pen-lifting attachment in operation.

Fig. 13 shows a fragmentary view of a typical bathythermograph chart, made with the pen-lifting attachment in operation.

Figure 6:
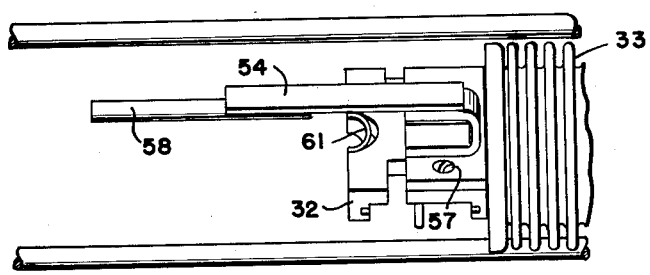
Fig. 6 shows the trigger attached to the pressure element of the bathythermograph.

Referring now to the drawings, wherein like reference characters designate like or corresponding parts throughout the several views, there is shown in Fig. 1 a view of a complete bathythermograph 21 consisting of an elongated, tubular casing 22, and a tail section 23 formed into the shape of fins integrally attached to the casing 22. Wound around, coil fashion, within the tail 23 is a number of turns of xylene-filled copper tubing 24 which serves as a portion of the thermal element, said element to be more fully described hereinafter. Surrounding the tubular casing 22 of the instrument, and slidable along the major portion of its length, is a sleeve 25 which serves as a movable cover for an opening 26 (Figs. 7-11) in the casing 22; the opening 26 providing access to a compartment 27 (Figs. 7-11) within the tubular casing 22 in which is housed the recording equipment and its associated pen lifting attachment, which will be fully described hereinbelow. The bracket 28 attached to 22, and the cable 29 serve as a convenient means for towing the instrument 21 and retrieving it once it has been lowered into the water.

Within the compartment 27, and easily accessible through the opening 26 is a smoked glass slide 31, or any other accepted means, on which may be recorded a chart of the temperature-pressure variations as measured by the instrument; the smoked glass slide 31 being held in position by means of a mounting bracket 32 (Figs. 7-10) rigidly attached to a bellows 33. The bellows 33 are located within the tubular casing 22 and are mounted to have their compression axis parallel to the long axis of casing 22 so that when there is any variation in the pressure of the medium surrounding the instrument, the bellows will respond thereto to move the smoked glass slide 31 in conformance to this variation. The slide 31 is clearly shown in Figs. 7-10 mounted in position in the bracket 32.

Rigidly attached to and forming a part of the thermal element (not shown) is a pen 34 which moves in response to variations in the temperature of the medium surrounding the instrument and measured by the coils 24 in tail section 23. At the extremity of pen 34 there is mounted a point or stylus 35, which when readings are being taken by the instrument, is in direct contact with the glass slide 31 so that it scratches on the slide a chart similar to those shown in Figs. 12 and 13. The pen 34 is attached by suitable linkages, clearly shown in Fig. 2, to the thermal element so that the stylus 35 will move transversely to the long axis of casing 22 and also the compression axis of bellows 33. Thus the charts shown in Figs. 12 and 13 are the resultant of two independent motions; namely, that of the bellows 33 (and its attached glass slide 31) moving along the long axis of the casing with variations in pressure, while at the same time the pen and stylus 35 is moving transversely across the glass slide with variations in temperature.

Also located within compartment 27, and operating in cooperation with pen 34 is a pen lifting attachment consisting of three main elements designated as pen lifter 36, trigger 37, and latch 38. The pen lifter 36 and latch 38 are mounted, as can be clearly seen in the enlarged view Fig. 2, upon two rods 41 integrally attached to collar 42 which forms a support for the thermal element and tail section 23. The pen lifter is pivotally mounted on a shaft 43 attached to one end of the rods 41 and consists of a piece of sheet brass, or the like, pressed into the shape shown in Fig. 3 wherein the front edge is bent approximately 60° from the general plane of the device to form lip 44 and the rear edge 49 is cut to form a shoulder 50 and an initiating tab 45 extending in a direction opposite to that of lip 44. Wound around the shaft 43, and positioned to urge the pen lifter 36 in a clockwise direction as viewed from the angle of Figs. 7-10, is a spring 46 whereby when the pen lifting attachment is in operation the spring 46 tends to rotate the element 36 about shaft 43 until lip 44 presses against pen 34 to move it out of contact with glass slide 31. Initiating tab 45 extends through a slit 47 in casing 22 to initially set into operation the pen lifting attachment, the complete operation of which will be described hereinafter.

The latch 38 which is shown in enlarged view, Fig. 5, may also be of sheet brass, or the like, pressed into the general shape of a U, one prong of which is cut to form the notch 48 and triggering tab 51. Shaft 52, about which the latch 38 is free to turn, is mounted about midway of the rods 41 and has a spring 53 positioned on its to impart a clockwise rotation to latch 38, as seen from Figs. 7-10. It is to be noted that shaft 52 is so placed as to enable the shoulder 50, on the rear edge 49 of pen lifter 36, to enter the notch 48 of latch 38.

The remaining element of the automatic pen lifting attachment, the trigger 37, is shown in Fig. 4 and consists of a spring brass strip 54 fastened to a U-bend 55, which is turn is mounted on a plate 56; the plate 56 being fastened by screws 57 to the glass slide bracket 32 so that it is integral with, and moves with, bellows 33 and slide 31 along a path parallel to the long axis of casing 22. Rigidly attached to the free end of spring strip 54 is a trigger rod 58 which extends out beyond the end of 54 and which can bend up and down slightly due to the flexibility of 54, the length of trigger rod 58 determining the depth at which the pen lifter attachment will automatically move the pen 34 out of contact with slide 31, as will be fully described hereinafter in a description of the operation of the device.

The view shown in Fig. 11 of the drawings is a plan view of the compartment 27 whereby the location of the pen lifter 36, the trigger 37 and the latch 38, relative to one another, is clearly illustrated. The semicircular slot 61, shown in Fig. 11, is a recess in the bracket 32 whereby the glass slide 31 is more readily grasped for insertion or removal.

The chart shown in Fig. 12 is one which is typically recorded by a bathythermograph which does not utilize the automatic pen lifting arrangement disclosed by the instant invention. As has been stated hereinbefore the chart is recorded when the glass slide 31 moves parallel to the long axis of the casing 22 with variations in pressure while simultaneously and independently the pen 34 moves transversely to the long axis with variations in temperature. The curve is traced from A to B to C then back to B to A. In the portion B—C, of Fig. 12, there can be clearly seen the double trace recorded by pen 34 when the instrument is inserted into a medium of varying pressure and temperature and then withdrawn, while the portion B—A shows how vibration caused by the withdrawal almost completely obliterates a large portion of the chart.

Fig. 13 shows a chart recorded under conditions similar to those of Fig. 12, but this time an automatic pen lifter attachment was utilized on the instrument. Portion B'—C' still shows a double trace, but at point B' the pen lifter operated to remove the pen from the glass slide thereby leaving the portion B'—A' free from extraneous markings, resulting in a single clear trace. The point B' at which the pen lifter operates may be set at any desired pressure, depending upon the selected length of trigger rod 58.

The complete cycle of operation of the pen lifting attachment is shown in Figs. 7–11 and a description follows of the manner in which the device functions. As has been stated previously the pen lifting attachment may be incorporated in any type of bathythermograph and may be utilized or not as desired, and will in no way affect the normal functioning of the instrument should the automatic feature be undesirable.

Figure 7:
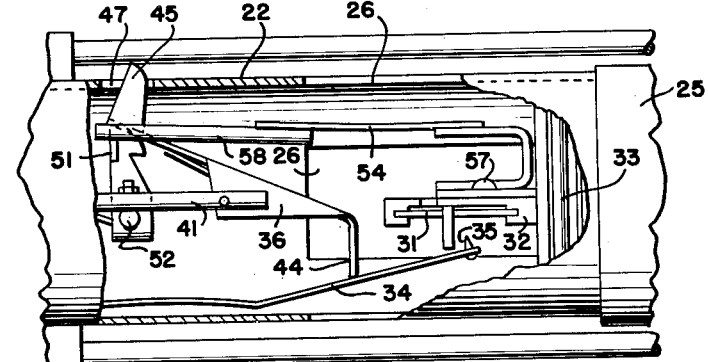

Fig. 7 shows the device in its untriggered, or at-rest, state such as when it is stored or else at the surface of the sea before being lowered therein. The glass slide 31 has been positioned in its bracket 32, and the pen 34 is held away from the slide by the pen lifter 36 which is urged into clockwise rotation by means of its spring 46. In this position it is to be noted that the initiating tab 45 now projects a short distance through slit 47 in casing 22 and is accessible from outside the casing. It can also be seen that triggering rod 58 rests upon triggering tab 51 of latch 38 and is thereby bent slightly upward against the action of spring brass strip 54.

Figure 8:
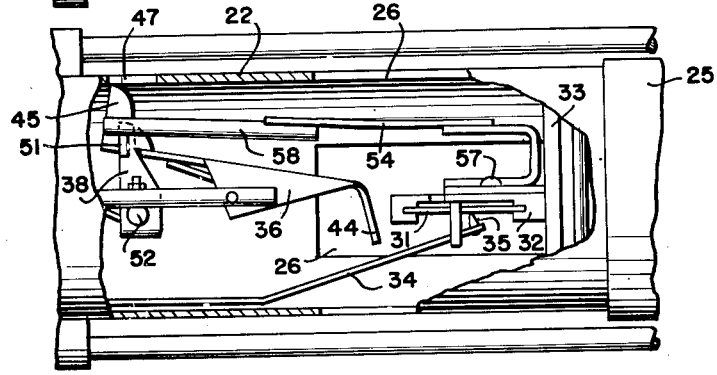
Figure 9:
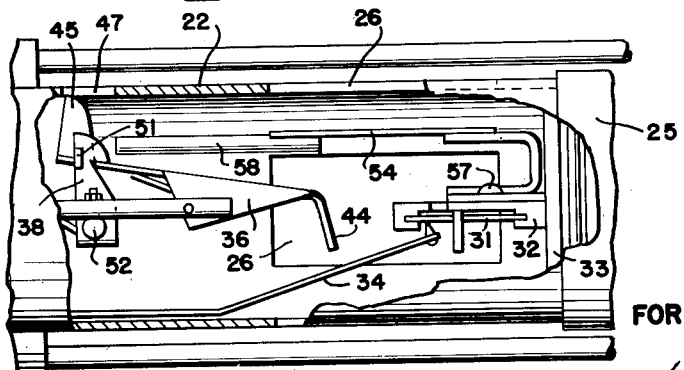

Now to initiate operation of the mechanism, the sleeve 25 is moved along casing 22 to its full extreme, such as shown in Fig. 1, and then it is retracted a short distance, say about an inch, until slit 47 is again uncovered. The result of this maneuver is shown in Fig. 8 wherein stylus 35 of pen 34 is now in contact with glass slide 31 ready for recording pressure-temperature relationships, the sleeve 25 having depressed initiating tab 45 to move pen lifter 36 out of contact with pen 34. The pen lifter 36 is held inoperative in this position since the depression of tab 45 has caused the shoulder 50, on the rear edge of the pen lifter, to move along the sloping edge of latch 38 and enter notch 48. The clockwise urging of latch 38 due to its spring 53 retains shoulder 50 in notch 38. Triggering rod 58 still rests upon tab 51, and the instrument is now ready for lowering into the sea.

As the instrument is lowered into the water the pressure of the medium increases causing bellows 33 to contract and in so doing the glass slide 31 is moved in a plane parallel with the long axis of the casing 22. As bellows 33 contracts it also carries with it triggering rod 58 until a point is reached where rod 58 slips off of tab 51 and the device assumes the state shown in Fig. 9. Pen lifter 36 is still held inoperative by latch 38.

When the instrument has been lowered as far as desired, such as shown at point C' in Fig. 13, and it is then raised toward the surface of the water, bellows 33 in expanding will advance the trigger rod 58 toward the latch 38. When rod 58 reaches the latch it will now be noted (Fig. 10) that the end of the rod will abut triggering tab 51, the spring strip 54 having acted to level out the rod from the position it occupied when it rested upon the tab. As the bellows 33 continue to expand and move rod 58, the rod will tilt latch 38 against its spring 53 until shoulder 50 is released from notch 48 thereby freeing the pen lifter 36, which due to the action of its spring 46 will rotate clockwise until lip 44 touches pen 34 and moves stylus 35 out of contact with slide 31. In rotating, pen lifter 36 not only moves stylus 35 away from the slide, but it also knocks rod 58 clear of tab 51 with the result that the entire mechanism resets itself to its starting position as shown by Fig. 7.

It can be clearly understood from the above description that the lifting mechanism can be designed to operate at any desired pressure on the upward path of the instrument merely by the expedient of altering the length of triggering rod 58 so that it releases the latch at a different point in the cycle of operation. In the situation illustrated, this point was the pressure corresponding to point B' of Fig. 13.

While the cycle of operation has been described as being initiated by the closing of sleeve 25 to cock the pen lifting mechanism by depressing tab 45, if so desired the mechanism may be cocked, instead, by hand through the expedient of inserting a small screw-driver or like implement into slit 47 and depressing pen lifter 36 until it is latched into notch 48, after which the cycle of operation will be the same as before.

After a perusal of the above description of the structure and operation of the present invention it is evident that there is disclosed a bathythermograph having an automatic pen lifting attachment which is effective in producing a single, clear and distinct record of the pressure-temperature relationship of the medium surrounding the instrument. The pen lifting attachment is simple and foolproof in operation, may be installed on all present models of bathythermograph and once installed may be used or not as desired. The device functions entirely automatically, acting to lift the recording pen at any desired pressure thereby to provide a chart which is clear and free of all extraneous markings due to vibration of the instrument as it is retrieved from the medium whose characteristics are being measured.

While the invention has been described in co-operation with a bathythermograph, it is to be recognized that it will function just as effectively on other types of measuring devices wherein there is a pressure change in one direction and then a reversal, and it is desired to record the pressure trend in one direction only. For example, such a device could be used to measure varying gas pressures, or any fluid pressures.

Obviously, many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed:

1. A bathythermograph with an automatic pen lifting arrangement whereby the pen is moved away from the record chart at a predetermined pressure when the device is being raised through the water comprising an elongated casing, a pressure responsive element mounted within the casing and fixed at one end thereto and having its compression axis parallel to the long axis of the casing, a chart holder attached to the free end of the pressure responsive element to move therewith with variations in pressure, a pen attached to a temperature responsive element and in contact with a record chart carried in said holder, the pen moving across the chart with variations in temperature as the chart moves with variations in pressure, spring-urged means pivoted to move the pen out of contact with said chart, latching means to abut one extremity of said spring-urged means for rendering said spring urged means inoperative, said latching means being pivoted normal to its plane and having a trigger tab parallel to the plane of the pivot, and a trigger means integral with the free end of said pressure responsive element so as to move parallel with the long axis of the casing with variations in pressure, the free end of said trigger means contacting the latching means so as to rest upon the trigger tab when the bathythermograph is at the surface, the trigger means moving away from said trigger tab as the casing is lowered into the water and the pressure increases, said trigger means abutting the trigger tab when the pressure decreases to a predetermined value thereby pivoting said latching means to release the spring-urged means for moving said pen out of contact with the record chart.

2. A bathythermograph comprising an elongated casing, a bellows type pressure responsive element mounted within said casing and fixed at one end thereto with the compression axis of the bellows parallel to the long axis of the casing, a chart holder integral with the free end of said bellows and in a plane parallel to the compression axis of the bellows, a pen mounted within said casing and positioned in the plane of a record chart carried in said holder, said pen being attached to a temperature responsive element and in contact with said record chart, the pen moving across the chart with variations in temperature as the chart moves with variations in pressure, pivoted spring-urged means positioned to move said pen out of contact with said chart in a direction normal to the plane of said chart, latching means to hold the spring-urged means inoperative, a portion of said latching means shaped normal to the plane of the long axis of the casing, and a triggering means integral with the free end of said bellows so as to move parallel to the long axis of the casing, said triggering means acting to abut said above-mentioned portion of said latching means at a predetermined pressure to thereby release said spring urged means for moving said pen out of contact with the record chart.

3. A pressure-temperature responsive device with an automatic pen-lifting attachment comprising a chart holder adapted to perform a forward and backward translatory motion with variations in pressure, a pen responsive to variations in temperature in contact with a chart in said holder, spring urged means for moving said pen out of contact with the chart, latching means to hold the spring urged means inoperative, and trigger means integral with said chart holder positioned to automatically release said latching means, said translatory motion at a predetermined pressure thereby lifting the pen from said chart.

4. A bathythermograph comprising a pressure-responsive element, a record chart holder adapted to be moved with a forward and backward translatory motion in its plane by said pressure-responsive element, a temperature responsive element, a pen in contact with a record chart in said holder and adapted to be moved by the temperature responsive element, pivoted spring urged means for moving said pen out of contact with the chart, pivoted latching means to hold the spring-urged means inoperative, and trigger means integral with said record chart holder positioned to automatically pivot through its translatory motion said latching means at a predetermined pressure thereby releasing the spring urged means to move the pen from said chart.

5. A pressure-temperature responsive device with an automatic pen lifting arrangement activated at a predetermined pressure comprising a pressure responsive element having a forward and backward translatory motion, a chart holder integral with said pressure responsive element, a temperature responsive element with a pen attached thereto, said pen being normally in contact with a chart in said holder, a first means to move said pen out of contact with said chart, latching means to hold said first means inoperative while pressure is changing in one direction, and trigger means integral with said pressure responsive element positioned to automatically release through said translatory motion said latching means when the pressure changes in the other direction to a predetermined value whereby said first means automatically moves the pen out of contact with said chart.

6. A recording device with an automatic pen lifting arrangement activated at a predetermined point comprising a pen for recording data on a chart as said chart moves with a forward and backward translatory motion, a first means for moving said pen out of contact with said chart, a second means for holding said first means inoperative while data is changing in one direction, and a third means positioned to automatically release said second means when the data changes in the other direction to a predetermined point whereby said first means moves the pen out of contact with said chart.

7. A recording device with a pen lifting attachment comprising a pen for recording data on a chart, said chart being mounted to move with a forward and backward translatory motion, spring urged means for normally moving said pen out of contact with the chart, latching means for maintaining the spring urged means inoperative while data is being recorded in one direction, and trigger means responsive to said translatory motion to release said latching means when predetermined data is recorded in the opposite direction.

8. A pressure responsive device with a pen lifting attachment comprising a chart, said chart being mounted to move with a forward and backward translatory motion, a pen for recording pressure on said chart, spring-urged means adapted to move said pen out of contact with the chart, pivoted latching means to maintain the spring urged means inoperative, and pressure operated trigger means responsive to said translatory motion to move into contact with and pivot said latching means at a predetermined pressure.

FORREST KELLY ECCLES.

REFERENCES CITED

The following references are of record in the file of this patent:

UNITED STATES PATENTS

| Number | Name | Date |
|---|---|---|
| 1,910,361 | Pick | May 23, 1933 |
| 1,946,576 | Dunn et al. | Feb. 13, 1934 |
| 2,015,851 | Herrick et al. | Oct. 1, 1935 |
| 2,190,260 | Ennis | Feb. 13, 1940 |
| 2,204,046 | Melville | June 11, 1940 |
| 2,331,810 | Spilhaus | Oct. 12, 1943 |
| 2,447,752 | Hathaway | Aug. 24, 1948 |